Figure 1:
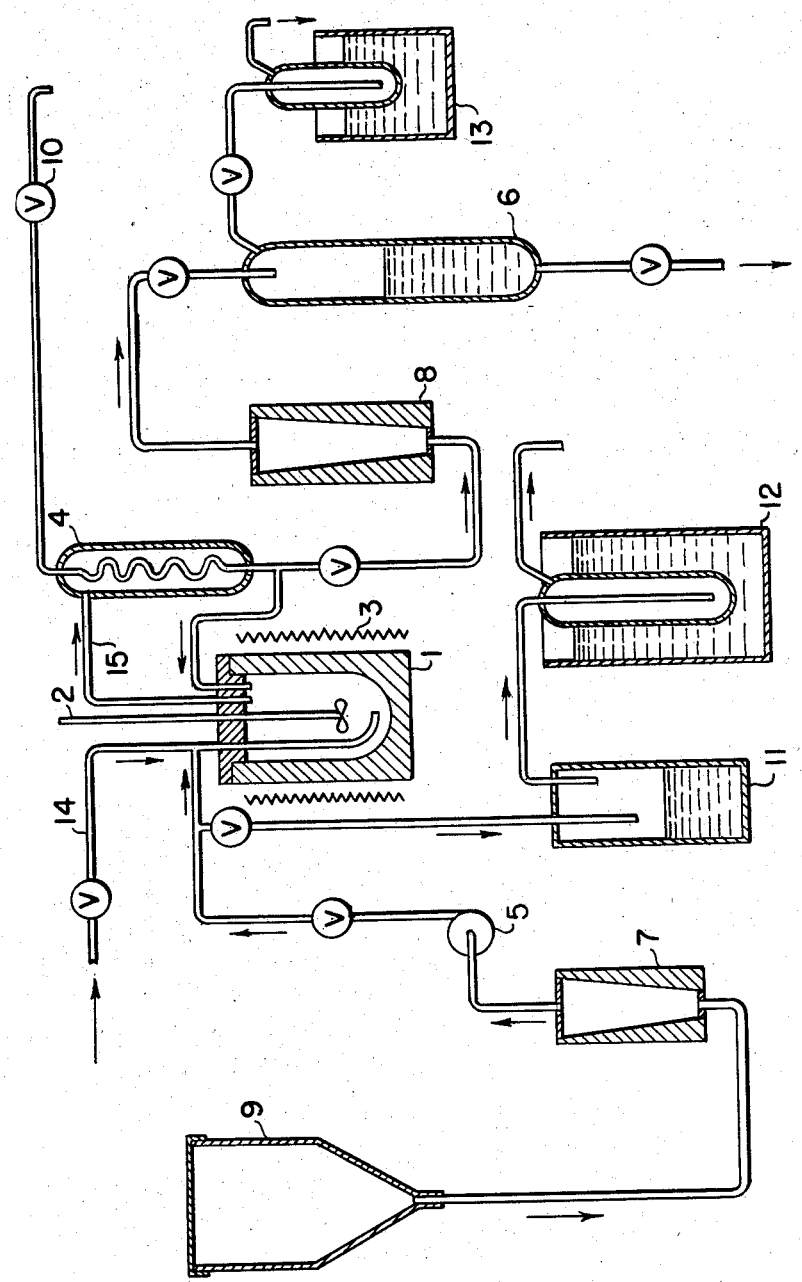

George N. Tyson, Jr.
*INVENTOR.*

April 28, 1959  G. N. TYSON, JR  2,884,440
PREPARATION OF BORATE ESTERS
Filed April 10, 1956  3 Sheets-Sheet 2

George N. Tyson, Jr.
INVENTOR.

BY
Adams, Forward and McLean
ATTORNEYS

George N. Tyson, Jr.
INVENTOR.

United States Patent Office 2,884,440
Patented Apr. 28, 1959

2,884,440

PREPARATION OF BORATE ESTERS

George N. Tyson, Jr., Claremont, Calif., assignor, by mesne assignments, to Olin Mathieson Chemical Corporation, a corporation of Virginia Application April 10, 1956, Serial No. 577,421

4 Claims. (Cl. 260—462)

My invention relates to a method for the conversion of borate salts to borate esters and can be employed in the recovery of the boron values present in borate-containing ores.

It is old in the art to prepare borate esters by reacting a suitable alcohol and a borate salt such as borax. In carrying out the reaction, sulfuric acid has been introduced into the reaction mixture to aid in the esterification. There is a need in the art, however, for a process which does not employ sulfuric acid, a material which ultimately is dependent for its manufacture upon a convenient source of sulfur.

In accordance with my present invention I have discovered a process for the manufacture of borate esters from suitable alcohols and borate salts which does not involve the use of sulfuric acid or other mineral acid. Instead, my process involves the use of carbon dioxide, and contemplates the production of lower borate esters by reacting the carbon dioxide, a borate and a lower saturated aliphatic alcohol to form the desired borate ester, and recovering the borate ester from the reaction mixture. The operation can be carried out effectively at elevated pressures or even at atmospheric pressure, if it is desired to do so.

The borate esters produced when my process is practiced are useful materials as such. If desired, however, they can be hydrolyzed using known methods to produce boric acid and an alcohol which can be recycled for use in the preparation of further quantities of borate ester. When my process is carried out using a sodium tetraborate as the borate salt and methanol as the alcohol, the reaction proceeds approximately as shown by the following equation:

(1) $Na_2B_4O_7 \cdot xH_2O + CO_2 + nCH_3OH \rightarrow$
$4(CH_3O)_3B + (x+6)H_2O + (n-12)CH_3OH + Na_2CO_3$ where $x$ represents the number of moles of water of hydration of the sodium tetraborate (10 where the tetraborate is borax) and $n$ represents the number of moles of methanol introduced into the reaction mixture. When the process is carried out, a certain amount of $NaHCO_3$ is also formed, the amount depending upon the particular reaction conditions under which the operation is carried out. The $NaHCO_3$ is probably formed by reaction between the $Na_2CO_3$ and $CO_2$ present in accordance with the following equation:

(2) $Na_2CO_3 + CO_2 + H_2O \rightarrow 2NaHCO_3$

Sodium bicarbonate and carbonate formed can, if desired, be calcined by known methods to release carbon dioxide for further use in the process.

The following examples illustrate specific embodiments falling within the scope of my invention and are to be considered not limitative.

EXAMPLE I

Two experiments were performed in this example employing the apparatus shown in Fig. 1. The apparatus was a one-gallon autoclave 1 provided with a stirrer 2 and heating means 3. The autoclave had associated with it auxiliary equipment including condenser 4, feed pump 5, high pressure receiver 6, flow meters 7 and 8, feed pot 9, back pressure regulator 10, low pressure receiver 11 and cold traps 12 and 13. The low pressure receiver was used to take reactor samples, remove reactor contents or aid in releasing pressure at the conclusion of an experiment. The pressure in the low pressure receiver was essentially atmospheric. The cold traps were used to remove as much of the products from the gas phase as possible and they were operated at Dry Ice-acetone temperatures of about −70° C. Vapors enter the condenser at about 195° C. and the cooling water employed in the condenser had a temperature of about 15° C.

In Experiment 1, 1880 ml. of methanol and 41.5 grams of borax were charged to the autoclave, which was then sealed, pressured with carbon dioxide through line 14 and heated to the operating temperature of 195° C. and 550 p.s.i.g. The reaction was conducted in this manner for a period of 2¼ hours, during which time a mixture of 38.1 grams of borax in 3140 ml. of methanol was introduced as a feed from feed pot 9 into autoclave 1 by means of proportioning pump 5 and also during which time carbon dioxide was introduced into autoclave 1 through line 14 in order to maintain the pressure in the autoclave at 550 p.s.i.g. Under the process conditions, methanol, water and trimethylborate distilled over through line 15 and were collected in high pressure receiver 6.

Table I below sets forth the results obtained in Experiment 1, as well as in Experiment 2, which was similarly conducted with the exception that a reaction period of 2 hours was used and also that methanol alone, rather than a mixture of methanol and borax, was introduced from feed pot 9 into autoclave 1.

EXAMPLE II

Figure 2:
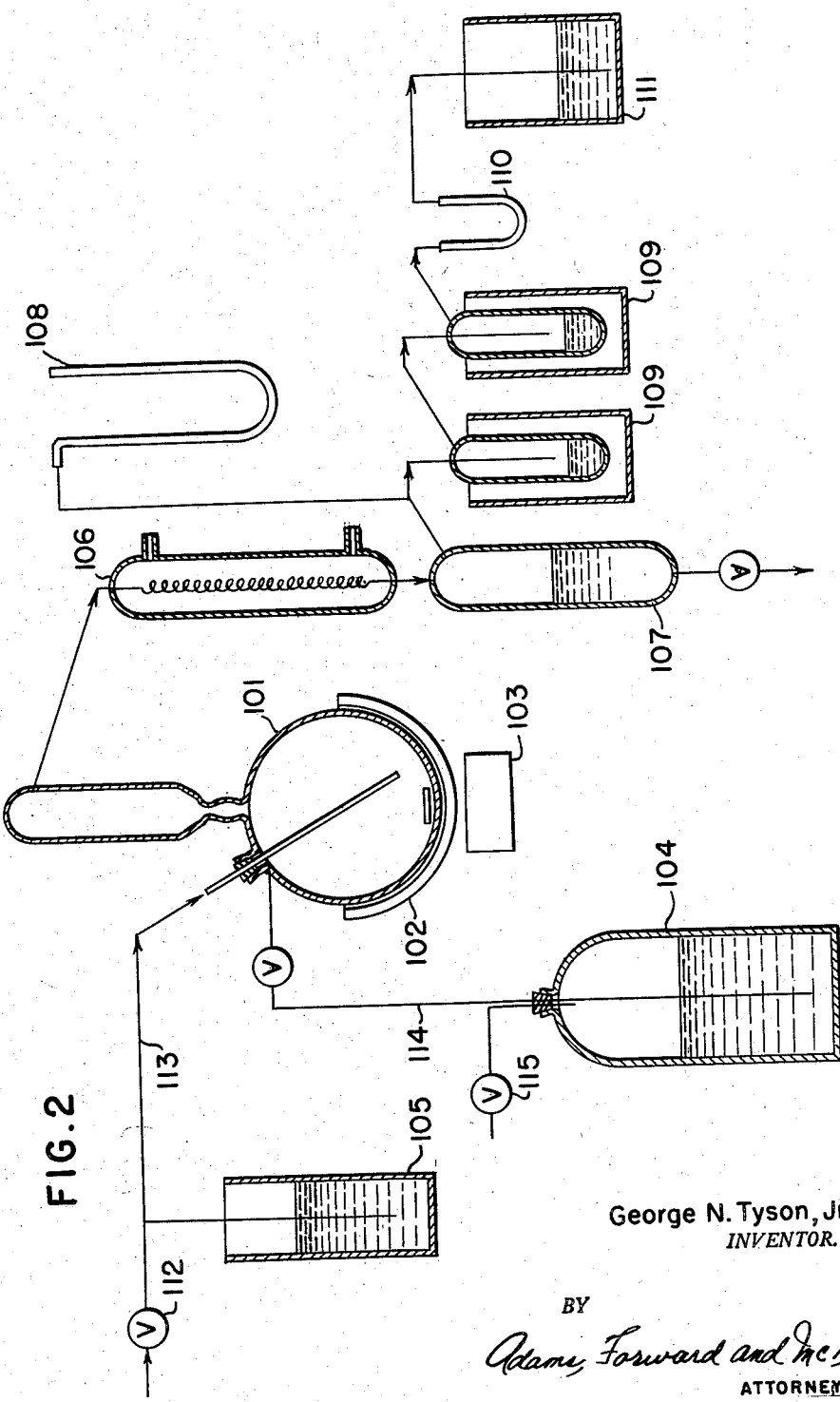

Two experiments (Experiments 3 and 4) were conducted in accordance with this example employing the apparatus shown in Fig. 2. The apparatus was made of glass, was run at atmospheric pressure and essentially comprised a reaction flask 101, which was equipped with a heating mantle 102 and a magnetic stirrer 103. The reaction flask had associated with it feed bottle 104 for supplying methanol, mercury bubbler 105, condenser 106, product receiver 107, manometer 108, cold traps 109, calcium chloride tube 110 and water bubbler 111.

In carrying out Experiment 3, 800 ml. of methanol and 21 grams of borax were introduced into reaction flask 101 and the mixture was then heated at atmospheric pressure to about 65° C. The reaction was run for a period of about 7 hours during which time a slow stream of carbon dioxide was introduced by means of line 113 containing valve 112 below the liquid level of the agitated reaction mixture. 2060 ml. of methanol was introduced into reaction flask 101 from feed bottle 104 through line 114, nitrogen pressure from line 115 serving to force the methanol from the feed bottle into the reaction flask. Condenser 106 was cooled with cooling water having a temperature of about 15° C. and product was collected in receiver 107. Cold traps 109 were employed to remove as much of the products from the gas phase as possible and were operated at Dry Ice-acetone temperature of about −70° C.

Table I below sets forth the results obtained in Experiment 3, as well as in Experiment 4 which was similarly conducted for a period of about 8 hours. In Experiment 4, more than the theoretical quantity of water distilled. The excess water is to be accounted for by atmospheric contamination.

Table I also includes the results obtained in Experiment 5. Experiment 5 was conducted without introducing carbon dioxide into the reaction mixture and hence does not fall within the scope of my invention. It will be noted that the results obtained (trimethylborate produced) in Experiment 5 are poor, in comparison with the results obtained when carbon dioxide is introduced into the reaction mixture as is done in accordance with my invention.

EXAMPLE III

Figure 3:
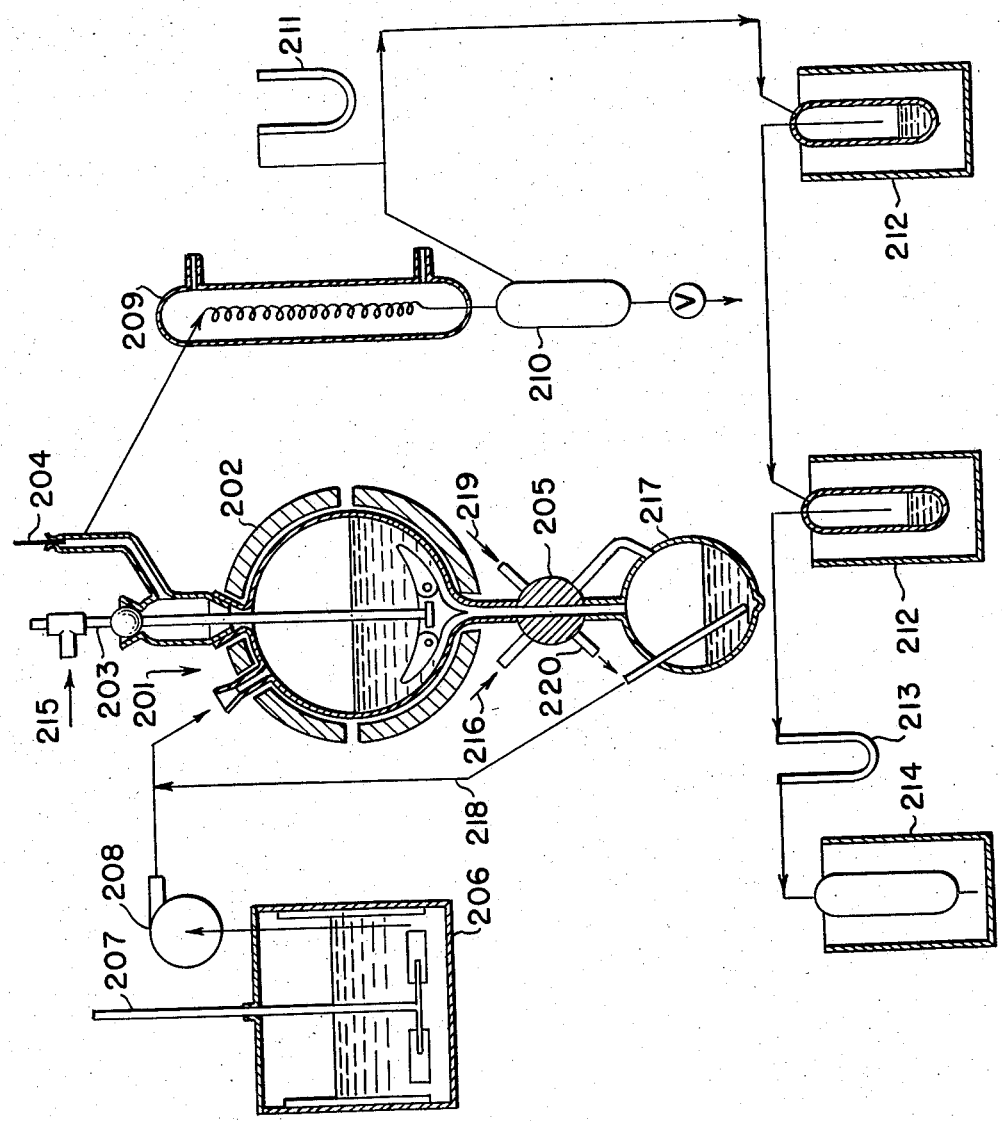

In accordance with this example, two semicontinuous runs (Experiments 6 and 7) were performed utilizing the apparatus shown in Fig. 3. The apparatus comprised a reaction flask 201, provided with heater 202, stirrer 203, thermometer 204 and valve 205 for salt removal. Associated with reaction flask 201 were feed tank 206, equipped with stirrer 207, pump 208, condenser 209 cooled with cooling water having a temperature of 15° C., receiver 210, manometer 211, cold traps 212 maintained at Dry Ice-acetone temperature of about −70° C., calcium chloride drier 213 and water bubbler 214.

In Experiment 6, which was run during a period of about 8 hours, a mixture of borax and methanol totaling 285 grams of borax and 3776 ml. of methanol was charged continuously from feed tank 206 to reaction flask 201 while the reaction flask was maintained at about atmospheric pressure and 65° C. During the reaction, a slow stream of carbon dioxide was introduced into reaction flask 201 through line 215. While the reaction was being carried out, sodium carbonate salts formed as a result of the reaction were removed intermittently usig valve 205. In order to do this, the valve was rotated counterclockwise and the salts present in the valve were blown dry with carbon dioxide introduced into line 216, this carbon dioxide also effecting recycle of liquid from pot 217 to reaction flask 201 by means of line 218. After this had been done, the valve was turned still further counterclockwise in order that the salts present therein could be washed out with methanol introduced through line 219 and removed through line 220 or manually scraped out, following which the valve was returned to its original or vertical position permitting flow from reaction flask 201 to pot 217. Product was collected in receiver 210.

Table I sets forth the results obtained in this experiment, as well as in Experiment 7, which was similarly performed.

Various modifications can be made in the procedures of the specific examples to provide other embodiments which fall within the broad scope of my invention. Thus, the examples illustrate the use of reaction temperatures of 65° C. and 195° C. and reaction temperatures intermediate those temperatures as well as above or below them can be utilized, if desired. Also, the reaction pressure can be varied widely, reaction pressures above 550 p.s.i.g. as well as below that pressure or at atmospheric pressure being useful.

The process can be carried out in the vapor phase as well as in the liquid phase. Thus, a gaseous mixture of the alcohol and carbon dioxide can be passed into contact with heated borate salt disposed in the form of a fixed, moving or fluidized bed to form the borate ester which is then separated from the reactor effluent. Excess carbon dioxide and alcohol present in the reactor effluent can be recovered and recycled to the reaction zone. Thus, a run was made in an apparatus consisting of a series of two test tubes. 100 ml. of methanol was placed in the first test tube and 5 grams of sodium tetraborate trihydrate in the second. Carbon dioxide gas was bubbled through the first test tube to obtain a mixture of methanol vapor and carbon dioxide and this mixture was passed into the second test tube containing the trihydrate. Both test tubes were placed in a small pot furnace controlled with a thermocouple at 60° C. The run lasted 4 hours and 70 cc. of methanol was collected from the effluent from the second test tube using an Erlenmeyer flask surrounded with an ice-water mixture. The condensate contained 0.28 gram moles per liter of boron, indicating a yield of trimethyl borate of 25 percent. A second run was made similarly, except that 0.5 gram of sodium tetraborate trihydrate was placed in Pyrex tubing instead of the second test tube in order to obtain a higher conversion. 50 ml. of methanol was collected containing about 50 percent of the boron present in the trihydrate. The yield of trimethyl borate was 63 percent, based upon the weight of the trihydrate converted.

In place of the methanol utilized in the specific examples, there can be substituted other lower saturated aliphatic alcohols, such as ethyl alcohol, normal propyl alcohol, isopropyl alcohol, normal butyl alcohol, secondary buty alcohol, and the like. Also, in place of the methanol utilized in the specific examples there can be substituted lower alkanol amines, such as monoethanolamine, diethanolamine, triethanolamine, monoisoprop-

*Table 1*

| Exp. No. | Feed | | Charge | | Products, ml. | | Analysis of Distillate, Percent of Theoretical | | Analysis of Residues | | |
|---|---|---|---|---|---|---|---|---|---|---|---|
| | Methanol, ml. | Borax, g. | Methanol, ml. | Borax, g. | Distillate | Residue | Water | TMB | Boron as Borax | NaHCO₃ | Na₂CO₃ |
| 1 | 3,140 | 38.1 | 1,880 | 41.5 | 2,350 | 2,552 | 90 | 63 | 23.2 | 2 | 5.0 |
| 2 | 3,140 | | 1,880 | 41.5 | 2,700 | 2,150 | 87 | 83 | 2.4 | 1.05 | 10.5 |
| 3¹ | 2,060 | | 800 | 21 | 1  500 / 2  500 / 3  500 | ND | ND | 66 / 16 / 6 | ND | ND | ND |
| | | | | | | | | Total  88 | | | |
| 4 | 4,855 | | 800 | 21 | 4,872 | 683 | 122 | 98 | 0.2 | 3.48 | 3.76 |
| 5¹ | ND | | 600 | 20.8 | 1  366 / 2  460 / 3  390 | ND | | 39 / 5 / 0 | ND | ND | ND |
| | | | | | | | | Total  44 | | | |
| 6 | 8,776 | 285 | | | 7,356 | 940 | | 75 | 63 | ND | ND |
| 7 | 8,024 | 431 | | | 7,843 | 410 | | 61 | 175 | | |

¹ Three samples of distillate collected.
ND—Not determined.

anolamine, diisopropanolamine, triisopropanolamine and the like. The process of my invention is generally applicable to the production of borate esters from borate salts, generally alkali metal or alkaline earth metal salts, and ores containing the same, for example, anhydrous sodium tetraborate, sodium tetraborate monohydrate, sodium tetraborate trihydrate, sodium tetraborate pentahydrate, sodium tetraborate decahydrate, sodium metaborate, anhydrous or hydrated sodium tetraborate, sodium pentaborate, colemanite, ulexite, kernite, probertite, Gerstley borate (a mixture of colemanite and ulexite), Searles Lake solids (essentially a mixture of sodium chloride, sodium sulfate, potassium chloride, sodium carbonate, borax and other salts) and the like.

I claim:
1. A method for the production of a borate ester which comprises reacting carbon dioxide, a borate salt containing water of hydration and a lower saturated aliphatic alcohol in the substantial absence of extraneous free water to form a borate ester and recovering the borate ester from the reaction mixture.
2. The method of claim 1 wherein said borate salt is borax.
3. The method of claim 1 wherein said alcohol is methanol.
4. The method of claim 1 wherein said borate salt is borax and wherein said alcohol is methanol.

References Cited in the file of this patent

UNITED STATES PATENTS 2,217,354   Appel _____ Oct. 8, 1940

OTHER REFERENCES

Khotinskii: Chemical Abstracts, vol. 23, p. 4441.
McCunn: Chemical Abstracts, vol. 28, p. 4833.